United States Patent
Yankov

(10) Patent No.: US 9,069,414 B2
(45) Date of Patent: Jun. 30, 2015

(54) TOUCHSCREEN SENSOR FOR TOUCHSCREEN DISPLAY UNIT

(75) Inventor: Vladimir Yankov, Washington Township, NJ (US)

(73) Assignee: NANO-OPTIC DEVICES, LLC, Santa Clara, CA (US)

( * ) Notice: Subject to any disclaimer, the term of this patent is extended or adjusted under 35 U.S.C. 154(b) by 458 days.

(21) Appl. No.: 13/565,773

(22) Filed: Aug. 2, 2012

(65) Prior Publication Data

US 2014/0035878 A1 Feb. 6, 2014

(51) Int. Cl.
*G06F 3/042* (2006.01)

(52) U.S. Cl.
CPC .................... *G06F 3/0421* (2013.01)

(58) Field of Classification Search
CPC ....... G06F 3/042; G06F 3/041; G02F 1/1335; G01B 11/14; G01J 1/04; F21V 8/00
See application file for complete search history.

(56) References Cited

U.S. PATENT DOCUMENTS

| | | |
|---|---|---|
| 5,717,434 A | 2/1998 | Toda |
| 5,815,141 A | 9/1998 | Phares |
| 5,854,450 A | 12/1998 | Kent |
| 6,091,406 A | 7/2000 | Kambara et al. |
| 6,469,267 B1 | 10/2002 | Welsh et al. |
| 6,483,498 B1 | 11/2002 | Colgan et al. |
| 6,587,097 B1 | 7/2003 | Aufderheide et al. |
| 6,819,316 B2 | 11/2004 | Schulz et al. |
| 6,825,833 B2 | 11/2004 | Mulligan et al. |
| 7,196,218 B2 | 3/2007 | Gaddy et al. |
| 7,196,696 B2 | 3/2007 | Li |
| 7,265,686 B2 | 9/2007 | Hurst et al. |
| 7,315,300 B2 | 1/2008 | Hill et al. |
| 7,593,005 B2 | 9/2009 | Baayramoglu |
| 8,130,202 B2 | 3/2012 | Levine et al. |
| 8,179,381 B2 | 5/2012 | Frey et al. |
| 2005/0076824 A1 | 4/2005 | Cross et al. |
| 2010/0302210 A1* | 12/2010 | Han et al. ................ 345/175 |
| 2011/0134036 A1 | 6/2011 | Suggs |

* cited by examiner

*Primary Examiner* — Tony N Ngo
(74) *Attorney, Agent, or Firm* — TransPacific Law Group; Pavel I. Pogodin, Esq.

(57) ABSTRACT

Proposed is a touchscreen sensor for touchscreen devices such as iPhones, iPads, etc. The sensor comprises a substrate that supports an IR laser light source that transmits light to a light-delivery ridge waveguide formed on one side of the substrate and an array of photoreceivers on the opposite side of the substrate. The light-delivery waveguide and the photoreceivers of the array are interconnected by a plurality of strip-like illumination waveguides that are divided by touch-sensitive detectors into input and output waveguides. The touch-sensitive detectors are distributed under the external plate with a density that changes optical conditions of the touch-sensitive optical detector when an object, e.g., a finger, touches the external plate. The place of contact is detected and is then used to activate the appropriate command.

17 Claims, 6 Drawing Sheets

TOUCHSCREEN SENSOR FOR TOUCHSCREEN DISPLAY UNIT

FIELD OF THE INVENTION

The present invention relates to touch-sensitive screens, or touch sensors, for displays. More particularly, the present invention relates to an optical touchscreen sensor unit that provides a control signal showing where the screen was touched by a finger or stencil.

BACKGROUND OF THE INVENTION

A touchscreen is an electronic display that detects the presence of touch and location of the touch within the field of the display. The term "touchscreen" originates from the nature of the screen that is to be touched with a finger or stylus in order to control or initiate commands displayed on the screen. Such commands can be represented on the screen in various forms such icons, words, pictures, etc. Touchscreens are typically used in devices such as tablet computers, iPads, and smart phones, e.g., iPhones, game consoles, etc.

A touchscreen enables one to interact directly with the display on the screen rather than through use of a cursor controlled by a mouse or touchpad. Furthermore, this can be done without requiring a hand-held device, except for a stylus, which sometimes may be needed for touchscreens. A touchscreen can be attached to a computer, can be used as a terminal that is connected to a network, and can be used in connection with digital devices such as mobile phones, video games, GPS devices, etc.

An essential part of a touchscreen is a touchscreen sensor which is an electronic device inherent in the visual display that is hidden from the user's view and neither obstructs nor impairs images on the screen.

There exists a great variety of touchscreen sensors for touchscreen displays that are described in many patent publications relating to construction of touch screens as well as to methods of their manufacture and use. In general, depending on the method of sensing, touchscreen sensors are divided into different groups such as resistive touchscreen sensors disclosed in U.S. Pat. No. 5,815,141 granted to Robert Phares in September 1998; U.S. Pat. No. 7,196,696 granted to Tsung-Ying Li in March 2007; U.S. Pat. No. 7,265,686 granted to G. Samuel Hurst, et al, in September 2007; U.S. Pat. No. 6,483,498 granted to Evan G. Colgan, et al, in November 2002; U.S. Pat. No. 7,196,218 granted to Ronald S. Cok, et al, in March 2007; U.S. Pat. No. 8,179,381 granted to Matthew H. Frey, et al, in May 2012; US Patent Applications 2005/0076824 published in April 2005 (inventors Eliza M. Cross, et al), and in many other patent publications.

All resistive touchscreen displays and their touch sensors may have differences in structural details, construction materials, etc., but, in general, any resistive touchscreen panel comprises several layers, the most important of which are two thin, transparent electrically resistive layers separated by a thin gap. The top screen (the screen that is touched) has a coating on the underside surface. Just beneath the coating on the underside surface is a similar resistive layer on top of its substrate. One layer has conductive connections along its sides, the other along the top and bottom. Electrical potential, which is applied to the aforementioned conductive connections, passes through one layer and is sensed at the other. When an object such as a finger or a stylus presses against the outer surface of the screen, the two layers become connected at the point of touch. As a result, at the time of contact, the panel is turned into a pair of voltage dividers. When touch occurs and the layers make contact, a resistor divider is formed across the top layer, and the voltage at the point of touch can be determined through use of a divider controller by different methods consisting of read-out signals of the divider.

A major benefit of resistive touch technology is its low cost. A disadvantage of existing resistive touchscreens is comparably poor image contrast caused by additional reflections from the extra layer of material placed over the image-producing part of the display.

The next group of touchscreen sensors for displays is a capacitive sensors. Capacitive touchscreen sensors for displays are described, e.g., in U.S. Pat. No. 6,819,316 granted to Stephen C. Shultz, et al, in November 2004; U.S. Pat. No. 6,469,267 granted to Laurence M. Welsh, et al, in October 2002; U.S. Pat. No. 6,587,097 granted to Brian E. Aufderheide, et al, in July 2003; U.S. Pat. No. 6,825,833 granted to Roger C. Mulligan, et al, in November 2004, and many others. In general, a capacitive touchscreen contains an insulator such as glass that is coated with a transparent conductor, such as indium tin oxide (ITO). Capacitive sensors of this type operate on the principle of distortion in the screen's electrostatic field when the screen is touched, e.g., by a person's finger. These changes in capacitance caused by distortions are measured in order to determine the location of touch. There are many technologies for realization of capacitive touchscreens and their sensors. For example, in devices used on the basis of surface capacitance, only one side of an insulator is coated with a conductive layer. A low voltage is applied to the layer, resulting in generation of a uniform electrostatic field. When a conductor, such as a human finger, contacts the uncoated surface, a capacitor is dynamically formed. The sensor's controller can determine the location of the touch indirectly from the changes in capacitance as measured from the four corners of the panel.

Some capacitive touchscreens are based on the principle of mutual capacitance, which makes use of the fact that most conductive objects are able to hold a charge if they are very close together. In mutual capacitive sensors, a capacitor is located at every intersection of each row and each column provided in the structure of the screen. For example, a matrix consisting of 16-by-14 arrays provides 224 independent capacitors. Bringing a finger or conductive stylus close to the surface of the sensor changes the local electrostatic field, which reduces the mutual capacitance.

Another modification of capacitive touchscreen sensors is a self-capacitance device, which may have the same grid formed by rows and columns as the grid of mutual capacitance sensors, but the rows and columns operate independently. With self-capacitance, the capacitive load of a finger is measured on each column or row electrode by a current meter. Self-capacitance produces a stronger signal than mutual capacitance, but it is not sufficiently accurate. Still another touchscreen technology, e.g., one described in U.S. Pat. No. 5,717,434 granted to Kohji Toda in February 1998, U.S. Pat. No. 5,854,450 granted to Joel Kent in August 1996, and, e.g., U.S. Pat. No. 6,091,406 granted to Shigeki Kambara, et al, in July 2000, is based on the use of surface acoustic waves, such as, e.g., ultrasonic waves, which pass over the touchscreen panel. When the panel is touched, a portion of the wave is absorbed. Such a change in the ultrasonic waves registers the position of the touch and sends this information to the controller for processing.

Among other touchscreen techniques worth mentioning is an acoustic pulse recognition system based on the principle that a touch at each position on the glass generates a unique sound, see, e.g., U.S. Pat. No. 7,315,300 granted to Nicholas P. R. Hill, et al, in January 2008, and U.S. Pat. No. 7,593,005 granted to Gokalp Bayramoglu in September 2009. Four tiny transducers attached to the edges of the touchscreen glass pick up the sound of the touch. The sound is then digitized by the controller and compared with a list of prerecorded sounds for every position on the glass. The cursor position is instantly updated to the touch location. Some systems of this type employ sensors to detect piezoelectricity in the glass, which occurs due to touch. Complex algorithms then interpret this information and provide the actual location of the touch. This technology claims to be unaffected by dust and other outside elements, including scratches. Since there is no need for additional elements on a screen, this technology also claims to provide excellent optical clarity. Also, since mechanical vibrations are used to detect a touch event, any object can be used to generate these events, including fingers and stylus. A downside is that after the initial touch, the system cannot detect a motionless finger. Also known in the art is the recently developed infrared touchscreen, see, e.g., U.S. Pat. No. 8,130,202 granted to James L. Levine, et al., in March 2012, which uses an array of X-Y infrared LED and photodetector pairs around the edges of the screen to detect a disruption in the pattern of LED beams. These LED beams cross each other in vertical and horizontal patterns. This helps the sensors to pick up the exact location of the touch. A major benefit of such a system is that it can detect essentially any input, including a bare finger, gloved finger, stylus, or pen.

Optical touchscreens are also a relatively modern development in touchscreen technology; see, e.g., US Patent Application 2011/0134036 published in June 2011 (inventor Bradley Neal Suggs). Here, two or more image sensors are placed around the edges (mostly the corners) of the screen. Infrared backlights are placed in the camera's field of view on the other side of the screen. A touch shows up as a shadow, and each pair of cameras can then be pinpointed to locate the touch or even to measure the size of the touching object. This technology is growing in popularity due to its scalability, versatility, and affordability, especially for larger units. Also known in the art are touchscreens that employ a combination of sensors based on different physical principles described above.

However, in spite of a great variety of various touchscreens and their sensors, an important problem encountered by conventional touchscreen devices is relatively high energy consumption compared with the energy consumption of old LCD and LED screens. For example, old mobile phones could last for a week or more on the same charge; typically, the standby time of such phones could exceed 360 hours over 15 days. However, the latest iPhone, which includes a touchscreen and other options, must be charged once every few days. Among other reasons, this frequent charging is associated with the fact that the energy requirement of touch sensors causes additional load on the batteries of the device, especially in handheld devices that incorporate such sensors. For this reason, the demand exists for the development of a new generation of touch sensors that would be more efficient from the viewpoint of energy consumption.

SUMMARY OF THE INVENTION

The main distinction of the touchscreen of the invention and the touchscreen sensor incorporated therein is that they operate on a laser light which is advantageous from the viewpoint of energy consumption. The touchscreen sensor of the invention comprises a thin transparent plate that can be either placed onto the screen of the display or made integrally therewith by using the screen as a substrate. In view of its transparency, the touchscreen is hidden from the user's view and neither obstructs nor impairs images on the screen because in addition to transparency, the touchscreen sensor of the invention operates on laser light at a wavelength invisible to the human eye, e.g., in the range of 810 nm to 960 nm.

According to one aspect of the invention, the optical touchscreen sensor comprises a thin transparent rectangular plate of the same planar dimensions as the touchscreen of the display device, onto which the sensor is to be placed, e.g., the screen of an iPhone or iPad. In cross-section of the touchscreen sensor shows a transparent substrate coated with cladding in which light-guiding core strips are formed and embedded. All layers are transparent. The total thickness of the plate-like sensor is in the range of 25 μm to 200 μm.

According to another aspect of the invention, the plate comprises a transparent substrate coated with a lower cladding and core strips on the lower cladding. However, instead of the upper part of the cladding the external part of the sensor is formed by a thin rigid and transparent protective plate that is spaced from the core strips with a small gap.

From the system point of view, the touchscreen sensor of the invention consists of three main subsystems: a light-delivery subsystem with a light source, an illumination subsystem, and a light-receiving subsystem. All three subsystems are formed on the same substrate. The light-delivery subsystem comprises a light source, such as an IR laser diode, and a light-delivery ridge waveguide that extends along the edge on one side of the substrate and is connected to the aforementioned light source. As mentioned above, the light source emits invisible laser light of a single wavelength, e.g., in the range of 810 nm to 960 nm.

Furthermore, the light-delivery ridge waveguide is provided with light-direction reorientation elements in the form of holograms which reorient the light to illumination ridge waveguides which are incorporated into the same light panel and are coupled with butt connections to the light-delivery ridge waveguide near its respective holograms.

The net formed by the light-illumination ridge waveguides comprises a plurality of parallel waveguide strips (10 to 10,000) arranged perpendicular to the light-delivery ridge waveguide. The illumination ridge waveguides support one or more light-propagating modes in the fast direction (direction perpendicular to the light panel) and are provided with waveguide gratings, or holograms, of the predetermined structure and shape applied onto the surface of these ridge waveguides.

The illumination ridge waveguides are divided into light-input ridge waveguides that are coupled with butt connections to the light-delivery waveguide near respective holograms and light-output ridge waveguides that are connected to photoreceivers of an array of photoreceivers that constitutes the light receiving subsystem.

Preferably, the photoreceivers are aligned with the holograms of the light-delivery waveguide and are arranged with the same pitch or with a pitch multiple to the pitch of the holograms of the light-delivery ridge waveguide. The light-input waveguides and light-output waveguides are arranged in an alternating order in the form of parallel strips between the light-delivery ridge waveguide and the array of photoreceivers.

Attached to mating ends of the neighboring input and output waveguides are light-transmitting and light-receiving holograms, respectively, which are located in proximity to each other in a side-by-side position and together form light-transmitting and light-receiving pairs. In fact, each pair of light-transmitting and light-receiving holograms forms a touch-sensitive detector that can detect whether or not an object touches the sensor or is located above the sensor. The touch sensor may be a light-sensitive sensor.

Both holograms of each pair are arranged so that the light emitted from the light-transmitting hologram cannot enter the light-receiving hologram other than by being scattered on the surface of the object in contact with the sensor, e.g., a finger.

Furthermore, the holograms within each pair may be slightly shifted with respect to each other in the longitudinal direction of the waveguides to a distance shorter than the length of one hologram, and the pairs, themselves, are arranged with predetermined pitches in the direction of the light-delivery ridge waveguide and in the direction of the illumination ridge waveguides. The pitches may be arbitrary, e.g., 2 to 4 mm, but in any case the position of the finger or stylus in contact with the touchscreen must be sensed by the light-sensitive detector beneath the point of contact with the screen.

Pitches of pairs in both directions are preferably equal to each other. Thus, light-transmitting and light-receiving holograms form a net of such pairs. Moreover, in the direction of the light-delivery ridge waveguide, the pairs of neighboring light-transmitting and light-receiving holograms lie on lines parallel to the light-delivery ridge waveguide, while in the direction toward the light-delivery waveguide the neighboring pairs lie on oblique lines that are slightly inclined with respect to the perpendicular to the light-delivery ridge waveguide. Such an arrangement provides uniformity in the distribution of pairs of light-transmitting and light-receiving holograms over the touchscreen area.

The illumination subsystem may be similar to that used in the light panel of the type disclosed in pending U.S. patent application Ser. No. 13/373,434 filed on Nov. 14, 2011 (Frontlight Unit with Binary Holograms for Reflective Displays). In each pair the light-transmitting holograms are 45° gratings (holograms) which are the subject of pending U.S. patent application Ser. No. 13/317,544 filed in Oct. 21, 2011.

Each grating can be, though not necessarily, apodized, to ensure that only the fundamental mode is present in the output waveguides. The grids must be mutually apodized in order to ensure uniformity between the branches of the light-output waveguides.

The illumination subsystem directs light propagating in the ridge waveguides from the plane into the third dimension, i.e., to the outer surface of the touch screen. The aim is to illuminate the touchscreen sensor surface so that light scattered by an object, e.g., a user's finger, over the surface of the touch sensor is detected by the pair of sensors, i.e., by the light-sensitive detector located under the point of contact of the object with the touchscreen.

One's finger may not necessarily be in physical contact with the touchscreen and may cause changes in the sensors' illumination conditions under the external plate at a certain short distance above the outer surface of the touchscreen. In other words, the illumination subsystem detects the scattered light of the object so that the intensity of the recorded signals can be used to determine the position of the finger or stylus on the surface of the touchscreen sensor. In the context of the present invention the term "external plate" designates an external plate as a separate part or the upper cladding if the latter is the outermost part of the touch sensor.

More specifically, light that enters the channel waveguides will radiate upward and will illuminate the surface of the touch sensor. The hologram parameters (length, depth of modulation) should be chosen so that most of the light is emitted. Curving the strokes of the holograms or chirping the holograms makes it possible to change the direction of light emission. In this case, however, it is required that in the absence of an object, the light reflected from the border of the upper cladding, the cover glass, etc., be prevented from falling onto the light-sensitive detectors of the light-illumination subsystem. The best option is one in which light is focused on the plane where the position of a finger is anticipated.

DETAILED DESCRIPTION OF THE INVENTION

The touchscreen sensor of the invention is described in more detail in the paragraphs below with reference to the accompanying drawings.

The main distinction between the touchscreen sensor of the present invention and traditional touchscreen sensors is that the touchscreen of the present invention operates on a laser light, which is advantageous from the viewpoint of energy consumption. The touchscreen sensor of the invention has a laminated structure that is completely transparent. In view of its transparency, the touchscreen sensor is hidden from the user's view and neither obstructs nor impairs images on the screen. This is possible because in addition to transparency, the touchscreen sensor of the invention operates on laser light at a wavelength invisible to the human eye, e.g., in the range of 810 nm to 960 nm.

Figure 1A:
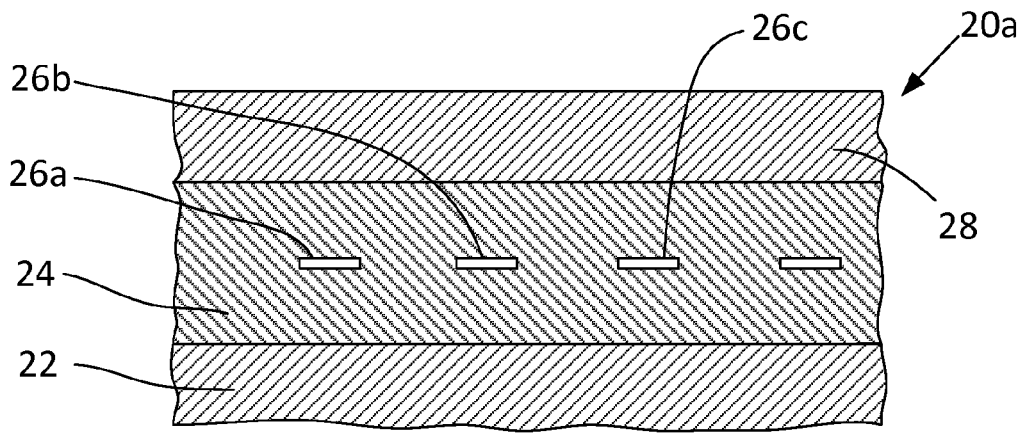
FIG. 1A is a cross-sectional view of a portion of the touchscreen sensor plate according to one aspect of the invention, the touchscreen sensor plate being attachable to the upper surface of the touchscreen display.

FIG. 1A is a cross-sectional view of a portion of the touchscreen sensor plate 20a according to one aspect of the invention. The touchscreen sensor plate 20a comprises a thin transparent rectangular plate of the same planar dimensions as the touchscreen of the display device (not shown in FIG. 1A) onto which the touchscreen sensor plate 20a is to be placed. This can be, e.g., the screen of an iPhone or iPad. In cross-section, the touchscreen sensor plate 20a comprises a transparent substrate 22 coated with a cladding 24 embedded in which are light-guiding core strips 26a, 26b, 26c, etc. The cladding is covered with an external plate 28. All layers are transparent. The total thickness of the plate-like sensor is in the range of 25 µm to 200 µm. The touchscreen sensor plate comprises a self-contained transparent unit intended for attachment to the screen of the touchscreen display.

Figure 1B:
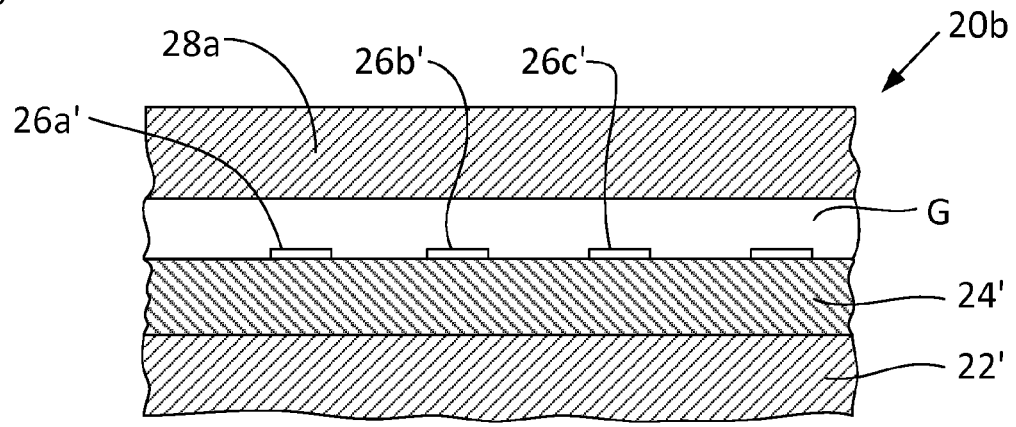
FIG. 1B is a cross-sectional view of a portion of the touchscreen sensor plate according to another aspect of the invention, wherein the external plate is spaced from the waveguides.

FIG. 1B is a cross-sectional view of a portion of the touchscreen sensor plate 20b according to another aspect of the invention. The touchscreen sensor plate 20b is similar to the sensor plate 20a shown in FIG. 1A and differs from it in that the external plate 28a that comprises a thin rigid and transparent protective plate is spaced from the core strips with a small gap G. The cores 26a', 26b', 26c', etc., and the substrate 30a are the same as in the modification of FIG. 1A but are formed on the surface of the lower cladding 24'.

Figure 1C:
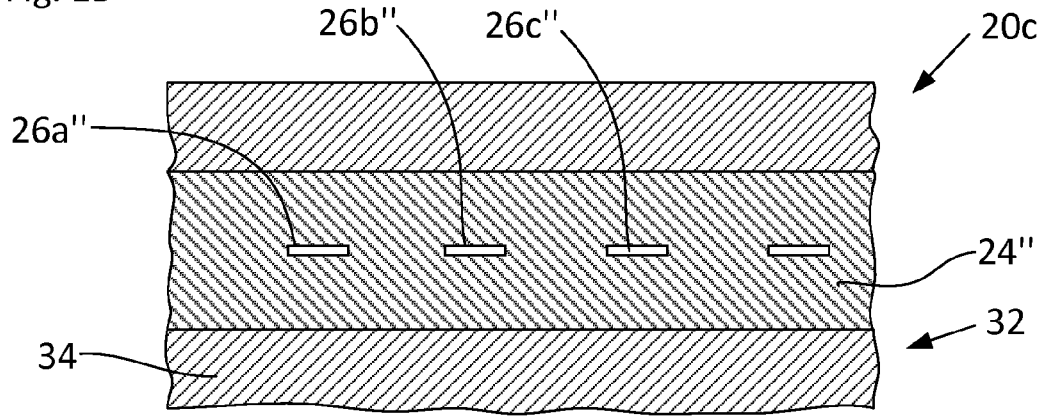
FIG. 1C is a cross-sectional view of a portion of the touchscreen sensor plate according to still another modification of the invention, the touchscreen sensor plate being an integral part of the touch screen display which is used as a sensor's substrate.

FIG. 1C is a cross-sectional view of a portion of the touchscreen sensor plate 20c according to still another modification of the invention. The touchscreen sensor 20c of this modification is not a self-contained device but is an integral part of a touchscreen 32 because the display 34 of the touchscreen functions as the sensor's substrate. Reference numeral 24" designates the cladding in which the cores 26a", 26b", 26c", etc., are embedded.

Figure 2A:
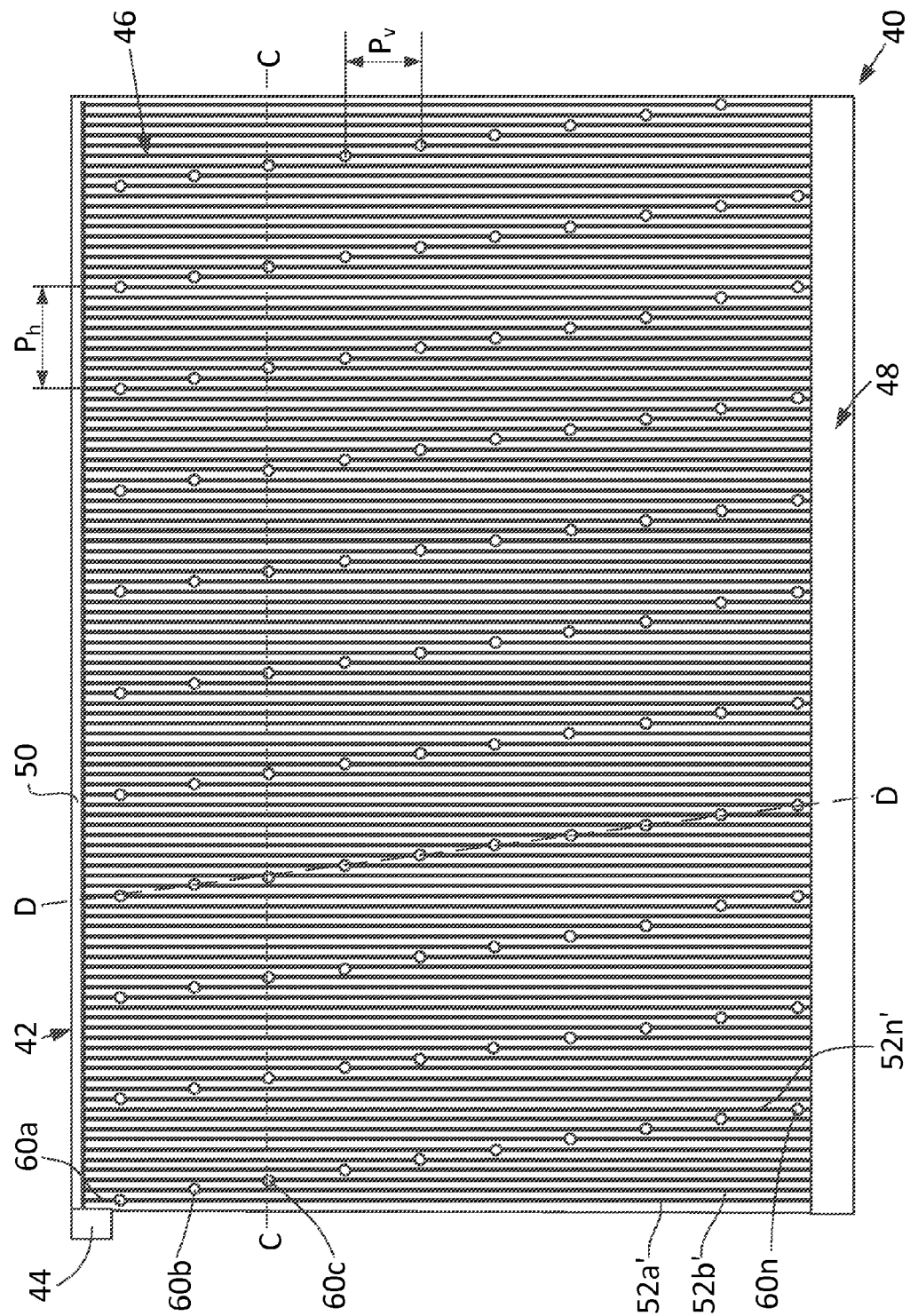
FIG. 2A is a reduced top view of the entire transparent touchscreen sensor of the invention shown in actual proportions of the sensor parts, white spots showing light-sensitive detectors formed by pairs of light-transmitting and light-receiving holograms.

As shown in FIG. 2A, which is a reduced top view of the entire transparent touchscreen sensor plate 40 of the invention shown with actual proportions of the sensor plate parts, from the system point of view, a touchscreen sensor plate 40 of the invention consists of three main subsystems: a light-delivery subsystem 42 with a light source 44, an illumination subsystem 46, and a light-receiving subsystems 48. All three subsystems are formed on the same substrate such as substrates 22, 30a, 30b, and 34 shown in FIGS. 1A, 1B, and 1C, respectively. The light source 44 of the light-delivery subsystem 42 comprises a laser light source, e.g., an IR laser diode, and a light-delivery unit in the form of a light-delivery ridge waveguide 50 that extends along the edge on one side of the sensor plate 40 and is optically coupled with the aforementioned laser diode 44. As has been mentioned above, the light source emits an invisible laser light of a single wavelength, e.g., in the range of 810 nm to 960 nm.

Figures 2B, 2C:
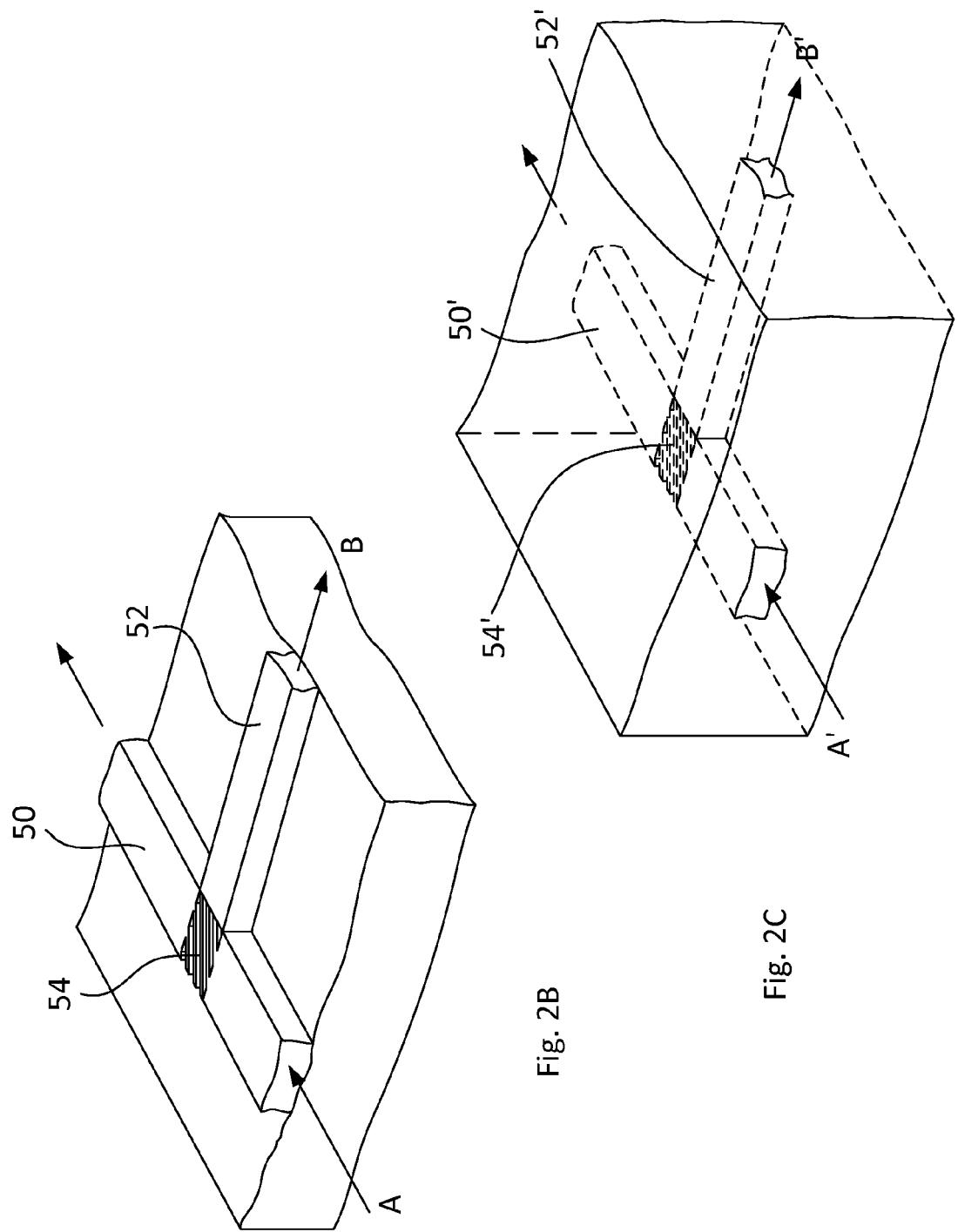
FIG. 2B is an enlarged three-dimensional view showing connection of an illumination ridge waveguide to the light-delivery ridge waveguide in the touchscreen sensor plate of modification shown in FIG. 1B.
FIG. 2C is an enlarged three-dimensional view illustrating butt connection for optical coupling of an illumination ridge waveguide to the light-delivery ridge waveguide in the touchscreen sensor plate of modification shown in FIGS. 1A and 1C.

FIG. 2B is an enlarged three-dimensional view of the butt connection for an optical coupling of an illumination ridge waveguide 52 (FIG. 2A) to the light-delivery ridge waveguide 50. The core surface of the light-delivery ridge waveguide 50 contains digital planar holograms, such the hologram 54 shown in FIG. 2B, which comprises the so-called 45° grating (hologram) that redirects the light propagating along the light-delivery ridge waveguide 50 from the laser diode 44 (FIG. 2A) in the direction of arrow A to the direction of arrow B, i.e., along the illumination ridge waveguide 52 which is perpendicular to the light-delivery ridge waveguide 50.

Although only one illumination ridge waveguide 52 is shown in FIG. 2B, as will be described below, a plurality of such illumination ridge waveguide is provided in the touchscreen sensor plate 40 with optical coupling to the light-delivery ridge waveguide 50 in areas where respective holograms, such as the hologram 54, are located. Such a structure is described, e.g., in earlier U.S. patent application Ser. No. 13/373,434 filed on Nov. 14, 2011. Similar to the device disclosed in the aforementioned patent application, the light-delivery ridge waveguide 50 and the illumination ridge waveguides such as the waveguide 52, have common structures in their cross-sections, i.e., the same structures as those shown in FIGS. 1A, 1B, and 1C. However, the light-delivery ridge waveguide 50 and the illumination ridge waveguides, such as waveguide 52, may be different in width.

FIG. 2C is an enlarged three-dimensional view illustrating butt connection for optical coupling of an illumination ridge waveguide 50' to the light-delivery ridge waveguide 52' in the touchscreen sensor plate of modification shown in FIGS. 1A and 1C.

Figure 3:
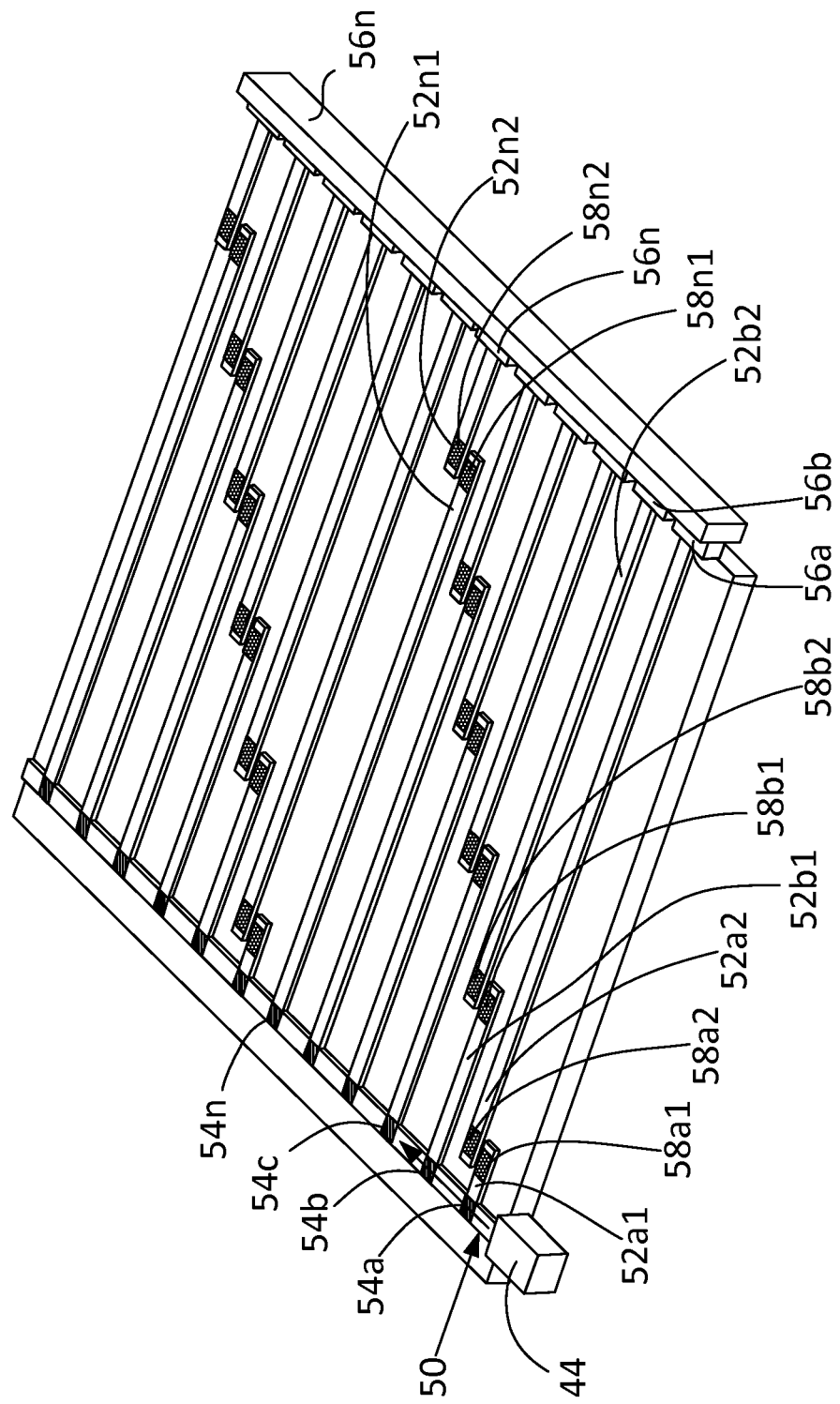
FIG. 3 is a three-dimensional view of the touchscreen sensor plate of the invention that is simplified to facilitate explanation of the invention.

FIG. 3 is a simplified three-dimensional view illustrating the arrangement and interaction of the light-delivery ridge waveguide 50 with a plurality of the illumination ridge waveguides 52a, 52b . . . 52n . . . , which are coupled to the light-delivery ridge waveguide 50. Although for simplicity of the drawing only a few of the illumination ridge waveguides are shown in FIG. 3, in reality the net formed by the light illumination ridge waveguides 52a, 52b . . . 52n . . . contains a large amount of such waveguide strips, the number of which may vary, e.g., from 10 to 10000. The illumination ridge waveguides 52a, 52b . . . 52n . . . support one or more light-propagating modes in the fast direction (direction perpendicular to the light panel).

As shown in FIG. 3, the illumination ridge waveguides 52a, 52b . . . 52n . . . are divided into light-input ridge waveguides 52a1, 52b1 . . . 52n1 . . . , which are coupled with butt connections to the light-delivery waveguide 50 at the location of the respective holograms 54a, 54b . . . 54n . . . and light-output ridge waveguides 52a2, 52b2 . . . 52n2 . . . , which are connected to photoreceivers 56a, 56b . . . 56n . . . of a photoreceiver array 56, which constitutes the light receiving unit or subsystem and is located on the side of the touchscreen sensor plate 40 opposite to the light-delivery ridge waveguide 50.

The photoreceivers 56a, 56b . . . 56n . . . are preferably aligned with the holograms 54a, 54b . . . 54n . . . of the light-delivery ridge waveguide 50 and preferably are arranged with the same pitch or with a pitch multiple to the pitch of the holograms of the light-delivery ridge waveguide. The light-input waveguides 52a1, 52b1 . . . 52n1 . . . and light-output waveguides 52a2, 52b2 . . . 52n2 . . . are arranged in an alternating order in the form of parallel strips between the light-delivery ridge waveguide 50 and the array 56 of photoreceivers 56a, 56b . . . 56n . . . .

Figure 4:
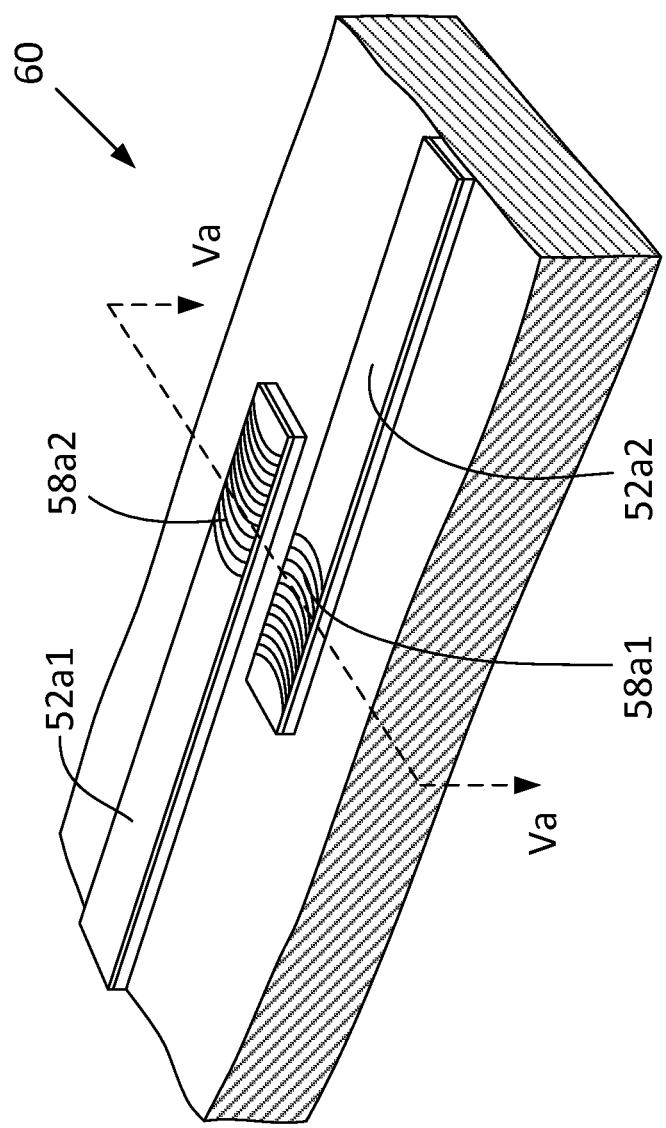
FIG. 4 is a three-dimensional view of the light-sensitive detector consisting of a pair of neighboring holograms formed at the ends of the input and output illumination ridge waveguides.

Attached to free ends of the neighboring input and output waveguides 52a1, 52b1 . . . 52n . . . and 52a2, 52b2 . . . 52n2 . . . are light-transmitting and light-receiving holograms 58a1, 58b1 . . . 58n1 . . . and 58a2 58b2 . . . 58n2 . . . , respectively, which are located in proximity to each other in a side-by-side position and together form a light-transmitting-receiving pairs. In fact, as shown in FIG. 4, each pair of light-transmitting and light-receiving holograms forms a touch-sensitive detector 60, which is a light-sensitive detector that can detect whether or not an object is located above it. For illustrative purposes FIG. 4 is a three-dimensional view of an arrangement of only one pair of the light-transmitting and light-receiving holograms 58a1 and 58a2.

Reference numerals 52a1 and 52a2 designate the respective light-input and light-output ridge waveguides. Reference 24' designates the lower cladding (assuming that this is a modification shown in FIG. 1B).

The white spots 60a, 60b . . . 60n . . . in FIG. 2A show light-sensitive detectors formed by pairs of light-transmitting and light-receiving holograms in their arrangement close to reality. In FIG. 2A, each line of lines 52a', 52b' . . . 52n' . . . designates a pair of neighboring input and output waveguides 52a1, 52b1 . . . 52n1 . . . and 52a2, 52b2 . . . 52n2 . . . , respectively.

It can be seen from FIGS. 3 and 4 that the mating ends of the light-input ridge waveguides 52a1, 52b1 . . . 52n1, which are opposite to the light-delivery ridge waveguide, and the ends of the light-output ridge waveguides 52a2, 52b2 . . . 52n2, which are connected to the respective photoreceivers, are located in proximity to each other.

In fact, division of the illumination waveguides into light-input waveguides which are located between the touch-sensitive optical detector and the light-delivery unit and the light-output waveguides which are located between the respective detector and the light-receiving unit is provided by the aforementioned touch-sensitive optical detectors 60a, 60b . . . 60n . . . .

Figure 5A:
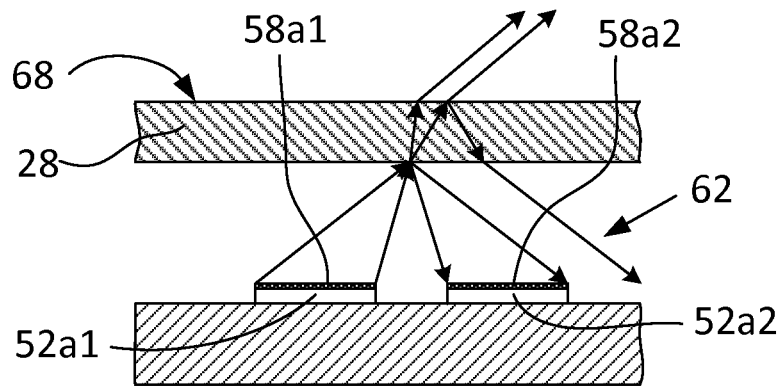
FIG. 5A is a sectional view of the touchscreen sensor of the invention illustrating optical interaction between the light-transmitting and light-receiving holograms of the light-sensitive detector in the absence of an object over the sensor.

Both holograms of each pair, such as the holograms 58a1 and 58a2, are arranged so that the light emitted from the light-transmitting hologram 58a1 cannot get into the light-receiving hologram 58a2 other than by being scattered on and reflected from the inner surface of the external plate under the a person's finger or another object which is in physical contact with the external plate of the sensor or in close proximity to it. This is shown in FIG. 5A, which is a sectional view along the line Va-Va in FIG. 4 of a portion of the touchscreen sensor plate 40 of the invention illustrating light scattering conditions in the absence of an object over the sensor.

In this drawing, reference numeral 58a designates a light transmitting hologram of the light-sensitive detector 60 (FIG. 4), and reference numeral 58b designates a light receiving hologram of the light-sensitive detector 60. Arrowed lines 62 show directions of scattered light. scattered light.

Furthermore, within each pair, the holograms, such as the holograms 58a1 and 58a2, a58b1 and 58b2 . . . 58n1 and 58n2 . . . are slightly shifted with respect to each other in the longitudinal direction of the waveguides at a distance of less than the length of one hologram (FIGS. 3 and 4), and the pairs or light-sensitive detectors 60a, 60b . . . 60n . . . , themselves, are arranged with a predetermined pitch $P_h$ in the direction of the delivery ridge waveguide 50 and with a predetermined pitch $P_v$ in the direction of the illumination ridge waveguides 52a', 52b' . . . 52n'. . . .

This is shown in FIG. 2A. The pitches $P_h$ and $P_v$ may be arbitrary, e.g., 2 to 4 mm, but in any case the position of a finger or stylus in contact with the touchscreen must be sensed by the light-sensitive detector beneath the point of contact with the sensor. Pitches of pairs in both directions are preferably equal to each other. Thus light-transmitting and light-receiving holograms form a net of pairs of the light transmitting and light receiving holograms. Each hologram can be, though not necessarily, apodized, to ensure that only the fundamental mode is present in the output waveguides. The grids have to be mutually apodized in order to ensure uniformity between the branches of the light output waveguides.

The light-delivery waveguide of the light-delivery unit and the light-receiving unit, i.e., the photoreceiver array, are linear, and although in the direction of the light-delivery ridge waveguide 50 the light-sensitive detectors 60a, 60b . . . 60n . . . of the neighboring light-input and light-output ridge waveguides 52a1 and 52a2, 52b1 and 52b2 . . . 52n1 . . . and 52n2 . . . lie on lines, such as line C-C in FIG. 2A, parallel to the light-delivery ridge waveguide 50, in the direction toward the photoreceivers the light-sensitive detectors 60a, 60b . . . 60n . . . , lie on oblique lines, such as line D-D shown in FIG. 2A, which are slightly inclined with respect to the perpendicular to the light-delivery ridge waveguide 50. Such an arrangement provides uniform distribution of pairs of light-transmitting and light-receiving holograms over the touchscreen area.

In other words, the light-sensitive detectors 60a, 60b . . . 60n are distributed on the substrate under the external plate with a density that changes optical conditions of the light-sensitive optical detector when an object touches the external plate.

The illumination subsystem may be similar to that used in the light panel of the type disclosed in aforementioned U.S. patent application Ser. No. 13/373,434 (Frontlight Unit with Binary Holograms for Reflective Displays). In each pair the light-transmitting holograms, such as holograms 58a1, 58b1 . . . 58n1 (FIG. 3) are 45° gratings (holograms) which are the subject of another pending U.S. patent application Ser. No. 13/317,544 filed on Oct. 21, 2011 by the same applicant.

Figure 5B:
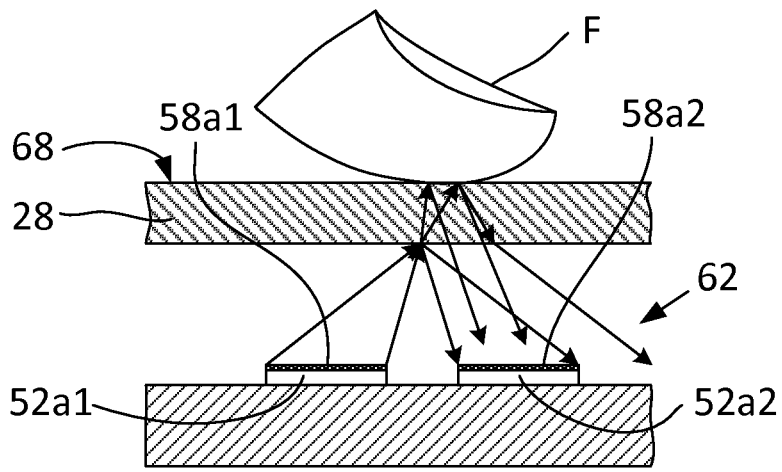
FIG. 5B is a view similar to one shown in FIG. 5A illustrating the change in optical interaction between the light-transmitting and light-receiving holograms of the light-sensitive detector when an object (e.g., a finger) physically contacts the upper surface of the touchscreen sensor.

Similar to the device of the aforementioned application, the illumination subsystem of the present invention that comprises the net of the illumination ridge waveguides 52a1, 52b1 . . . 52n1 . . . and 52a2, 52b2 . . . 52n2 . . . (FIG. 3) directs the light propagating in ridge waveguides from the plane of the touchscreen sensor plate 40 into the third dimension, i.e., to the inner surface of the external plate of the touch sensor. The aim is to illuminate the inner surface 68 of the external plate so that the light reflected from the external plate and scattered by an object, e.g., a user's finger, over the surface of the touch sensor could be detected by the pair of the sensors, i.e., the light-sensitive detector 60 located under the point of contact 64 of the object with the touchscreen. This condition is shown in FIG. 5B, which is a view similar to one shown in FIG. 5A and which illustrates the change in light-scattering conditions and optical interaction between the light-transmitting holograms, such as the hologram 58a, and light receiving holograms, such as the holograms 58b of the light-sensitive detector 60 when an object, e.g., a finger F, physical contacts the outer surface 68 of the touchscreen sensor plate.

The place of contact is detected and is then used for activation of an appropriate command, which is beyond the scope of the invention.

Figure 5C:
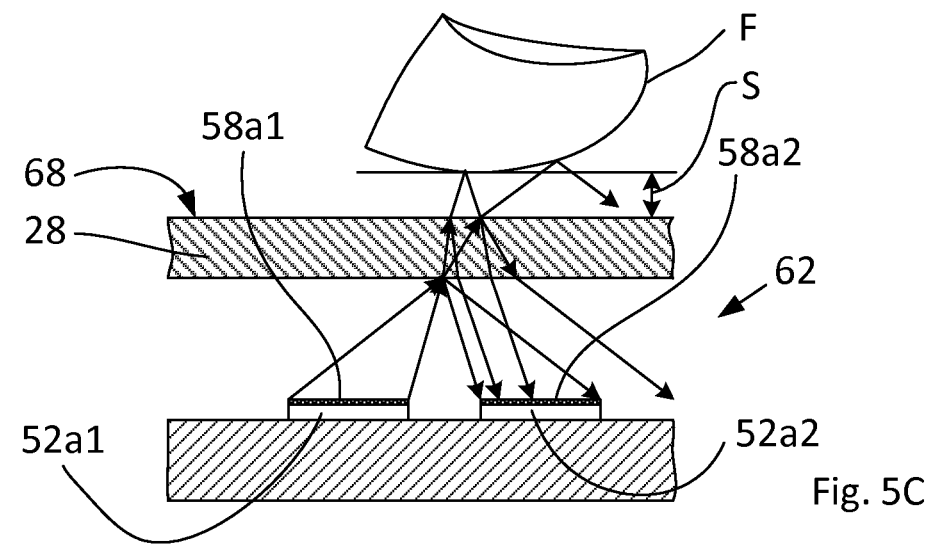
FIG. 5C is a view similar to one shown in FIG. 5C illustrating conditions when an object (e.g., a finger) is located above and in close proximity to the upper surface of the touch sensor but does not have a physical contact with the sensor.

The finger F may not necessarily be in physical contact with the touchscreen and may cause changes in the sensors' illumination conditions under the finger F at a certain short distance S above the outer surface 68 of the touch screen. This condition is shown in FIG. 5C. In other words, the illumination subsystem detects the scattered light of the object so that the intensity of the recorded signals can be used for determining the position of the finger or stylus on the surface of the touchscreen sensor.

More specifically, the light that goes through the illumination waveguides will be radiated upward and will illuminate the surface of the touch sensor. The hologram parameters (length, depth of modulation) should be chosen so that most of the light is emitted. By curving strokes of holograms or by chirping the holograms, it becomes possible to change the direction of light emission. In this case, however, it is required that in the absence of an object the light reflected from the border of the upper cladding, the cover glass, etc., be prevented from falling onto light-sensitive detectors of the light-illumination subsystem. The best option is one in which light is focused in the plane where the position of a finger is anticipated.

These requirements can be satisfied by using the hologram curving and chirping technique described in U.S. patent application Ser. No. 13/373,434 filed Jun. 27, 2012 which relates to a method of laser illumination with reduced speckling.

Although the invention has been shown and described with reference to specific embodiments, these embodiments should not be construed as limiting the areas of application of the invention, and any changes and modifications are possible provided these changes and modifications do not depart from the scope of the attached patent claims. For example, the external plate of the touch-sensitive sensor of the invention may not necessarily be transparent, and the invention also applies to devices such as a touchpad of a laptop computer where the position of the cursor on the screen of the computer display is controlled by finger on a nontransparent touchpad.

The invention claimed is:

1. A touchscreen sensor for a touchscreen device comprising:
   a substrate;
   a light source attached to the substrate;
   a light-delivery unit, which is formed on the substrate and connected to the light source;
   a light-receiving unit formed on the substrate;
   a plurality of ridge waveguides extending between the light-delivery unit and the light-receiving unit;
   a plurality of touch-sensitive optical detectors, each one being formed in one of the ridge waveguides and dividing the respective ridge waveguides into light-input waveguides, which are located between the touch-sensitive optical detector and the light-delivery unit, and light-output waveguides, which are located between the respective detector and the light-receiving unit; and
   an external plate that covers at least the ridge waveguides, the touch-sensitive detectors being distributed on the substrate under the external plate with a density that changes optical conditions of the touch-sensitive optical detector when an object touches the external plate.

2. The touchscreen sensor of claim 1, wherein the light source is a laser light source, the light-delivery unit comprises a light-delivery ridge waveguide that is connected to the laser light source, and the light-receiving unit comprises an array of photoreceivers.

3. The touchscreen sensor of claim 2, wherein each touch-sensitive optical detector comprises a pair of optically interacting holograms, one of which is formed on the end of the respective light-input waveguide and the other on the end of the respective light-output waveguide.

4. The touchscreen sensor of claim 1, wherein at least the substrate, the ridge waveguide, and the external plate are transparent.

5. The touchscreen sensor of claim 2, wherein at least the substrate, the ridge waveguide, and the external plate are transparent.

6. The touchscreen sensor of claim 3, wherein at least the substrate, the ridge waveguide, and the external plate are transparent.

7. The touchscreen sensor of claim 1, wherein the light-delivery unit and the light-receiving unit are linear and wherein in a direction parallel to the light-receiving unit the touch-sensitive detectors lie on lines parallel to the light-delivery unit while in the direction from the light-delivery unit toward the light-receiving unit the touch-sensitive detectors lie on oblique lines that are inclined with respect to a perpendicular between the light-delivery unit toward the light-receiving unit.

8. The touchscreen sensor of claim 3, wherein the light-delivery unit and the light-receiving unit are linear and wherein in a direction parallel to the light-receiving unit the touch-sensitive detectors lie on lines parallel to the light-delivery unit while in the direction from the light-delivery unit toward the light-receiving unit the touch-sensitive detectors lie on oblique lines that are inclined with respect to a perpendicular between the light-delivery unit toward the light-receiving unit.

9. The touchscreen sensor of claim 6, wherein the light-delivery unit and the light-receiving unit are linear and wherein in a direction parallel to the light-receiving unit the touch-sensitive detectors lie on lines parallel to the light-delivery unit while in the direction from the light-delivery unit toward the light-receiving unit the touch-sensitive detectors lie on oblique lines that are inclined with respect to a perpendicular between the light-delivery unit toward the light-receiving unit.

10. A touchscreen sensor for a touchscreen display unit comprising:
    a transparent substrate having a shape that corresponds to the shape of the display;
    a laser light source attached to the transparent substrate;
    a light-delivery ridge waveguide formed on said substrate on one side thereof and optically coupled to the laser light source;
    a photoreceiver array that has a plurality of photoreceivers and is attached to the side of the substrate opposite to the light-delivery ridge waveguide;
    a plurality of light-direction reorientation elements formed on the light-delivery ridge waveguide for reorientation of light that propagates from the laser light source along the light-delivery ridge waveguide to the direction perpendicular to the light-delivery ridge waveguide, the number of light-direction reorientation elements corresponding to the number of photoreceivers;
    a plurality of pairs of parallel illumination ridge waveguides that are formed on the substrate adjacent to each other but spaced from each other and that extend between the light-delivery ridge waveguide and the respective photoreceivers, each pair of the illumination ridge waveguides comprising light-input ridge waveguides that are coupled with butt connections to the light-delivery ridge waveguide in the place near the light-direction reorientation elements and light-output ridge waveguides that are connected to the respective photoreceivers, the mating ends of the light-input ridge waveguides that are opposite to the light-delivery ridge waveguide and the ends of the light-output ridge waveguides that are connected to the respective photoreceivers being located in proximity to each other;
    a plurality of light-sensitive detectors that comprise a pair of light-sensitive elements formed on the mating ends and that are under conditions of mutual optical interaction; and
    an external plate that covers at least the illumination ridge waveguides, the light-sensitive detectors being distributed under the external plate with a density that provides change in the optical mutual interaction between the light-sensitive elements of the light-sensitive detectors when an object is brought in contact or in proximity with the external plate.

11. The touchscreen sensor of claim 10, wherein the laser light source is an IR laser diode operating in an invisible wavelength range.

12. The touchscreen sensor of claim 11, wherein the light-direction reorientation elements are 45° gratings that redirect light from the light-delivery ridge waveguide to the light-input ridge waveguides.

13. The touchscreen sensor of claim 11, wherein the light-delivery ridge waveguide and the photoreceiver array are linear and wherein in a direction parallel to the light-delivery ridge waveguide the light-sensitive detectors lie on lines parallel to the light-delivery ridge waveguide while in the direction from the light-delivery unit toward the photoreceiver array the light-sensitive detectors lie on oblique lines that are inclined with respect to a perpendicular between the light-delivery ridge waveguide toward the photoreceiver array.

14. The touchscreen sensor of claim 12, wherein the light-delivery ridge waveguide and the photoreceiver array are linear and wherein in a direction parallel to the light-delivery ridge waveguide the light-sensitive detectors lie on lines parallel to the light-delivery ridge waveguide while in the direction from the light-delivery unit toward the photoreceiver array the light-sensitive detectors lie on oblique lines that are inclined with respect to a perpendicular between the light-delivery ridge waveguide toward the photoreceiver array.

15. The touchscreen sensor of claim 10, wherein the light-sensitive elements of the light-sensitive detectors comprise a pair of holograms.

16. The touchscreen sensor of claim 12, wherein the light-sensitive elements of the light-sensitive detectors comprise a pair of holograms.

17. The touchscreen sensor of claim 14, wherein the light-sensitive elements of the light-sensitive detectors comprise a pair of holograms.

* * * * *